(No Model.)
S. C. MENDENHALL.
MANUFACTURE OF GLASS ROLLERS.
No. 314,971. Patented Mar. 31, 1885.
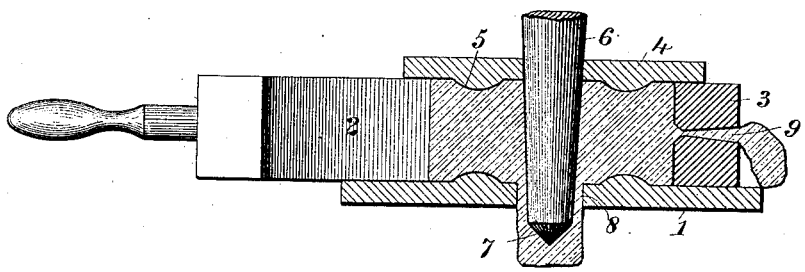
Attest:
Geo. P. Smallwood,
Edward Stew.
Inventor:
Stephen C. Mendenhall
By Knight Bros
attys.

UNITED STATES PATENT OFFICE.

STEPHEN C. MENDENHALL, OF RICHMOND, INDIANA.

MANUFACTURE OF GLASS ROLLERS.

SPECIFICATION forming part of Letters Patent No. 314,971, dated March 31, 1885.

Application filed January 29, 1885. (No model.)

*To all whom it may concern:*

Be it known that I, STEPHEN C. MENDENHALL, a citizen of the United States, residing at Richmond, in the county of Wayne and State of Indiana, (present business address Cincinnati, Ohio,) have invented a new and useful Improvement in Molds for the Manufacture of Glass Rollers, of which the following is a specification.

The object of the invention is to provide a mold by means of which glass rollers can be molded while in a molten state, with an axial opening, in which a suitable bushing may be afterward inserted in any desired manner. To this end I provide a mold having combined therewith a plunger, which is adapted to pass through the cap-plate of the mold and completely through the chamber containing the molten glass, the arrangement being such that when the molten glass is placed in the mold and the plunger forced down it will force the glass into all the corners of the mold, expel the surplus glass through suitable wasteways, and form an axial opening, preferably of slightly tapering form, in the roller.

In order that the invention may be better understood, I will proceed to describe it with reference to the accompanying drawing, which represents a vertical section of my improved mold.

In the said drawing, 1 is a base-plate, and 2 3 are jaws hinged thereto in customary manner. 4 is a cap-plate having capacity for horizontal motion independent of said jaws and base-plate. In case the roller is to be made with grooves 5, as here shown, it will also be necessary to give the cap-plate slight liberty or vertical movement; but it is not necessary to form such grooves on the roller, as the sides thereof may be made perfectly flat. 6 is a plunger adapted to pass through the cap-plate 4, and when in its lowermost position fill the opening in said cap-plate. The lower end of the plunger is made conical, as shown at 7, and preferably the whole of the portion of the plunger passing through the mold is made slightly tapering. A gate, 8, is made in the center of the base-plate for the passage of the lower end of the plunger and for any surplus glass which may be forced out ahead of it. 9 is a second gateway made in one of the jaws 3, to permit the escape of surplus glass when the mold has been filled to its utmost capacity by the pressing down of the plunger.

It is understood that the roller, after having been formed in this mold, is carefully annealed so as to toughen the glass to as great a degree as possible.

Having thus described my invention, the following is what I claim as new therein and desire to secure by Letters Patent:

1. A mold for glass rollers having an interior chamber of the desired conformation of the roller, and a vertical plunger adapted to pass entirely through the said chamber, substantially as set forth.

2. A mold for glass rollers having a plunger for forming an axial opening, and suitable gateways for the glass in excess, substantially as described.

3. In combination with a mold for glass rollers, a plunger having conical end, substantially as and for the purpose set forth.

STEPHEN C. MENDENHALL.

Witnesses:
 HARRY E. KNIGHT,
 OCTAVIUS KNIGHT.